K. KARLSSON & F. E. JOHANSON.
BALL CAGE FOR BALL BEARINGS.
APPLICATION FILED AUG. 11, 1915.
1,223,395.
Patented Apr. 24, 1917.
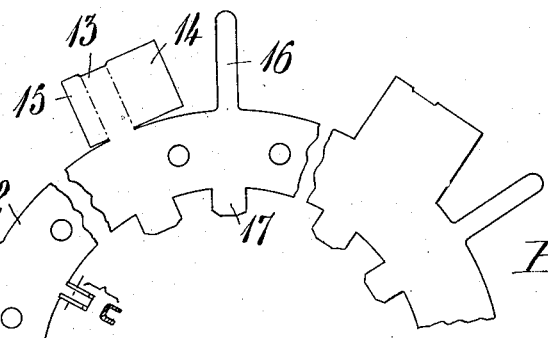
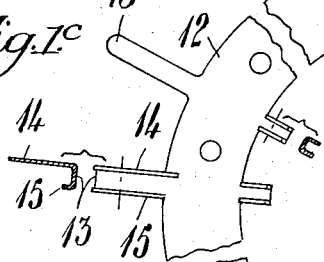
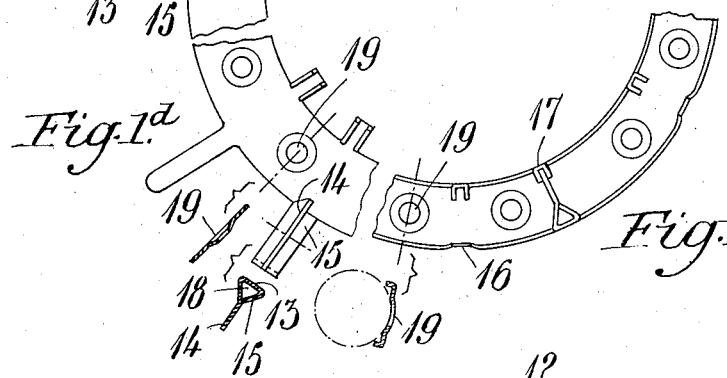
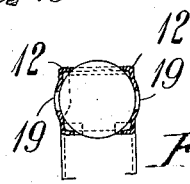
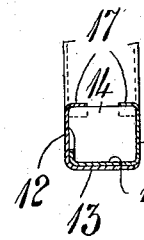
Inventors:
Kaleb Karlsson and
Frans Emanuel Johanson
By Attys
Fraser, Trask & Myers

UNITED STATES PATENT OFFICE.

KALEB KARLSSON AND FRANS EMANUEL JOHANSON, OF GOTTENBORG, SWEDEN, ASSIGNORS TO AKTIEBOLAGET SVENSKA KULLAGERFABRIKEN, OF GOTTENBORG, SWEDEN, A CORPORATION OF SWEDEN.

BALL-CAGE FOR BALL-BEARINGS.

1,223,395. Specification of Letters Patent. Patented Apr. 24, 1917.

Application filed August 11, 1915. Serial No. 44,906.

*To all whom it may concern:*

Be it known that we, KALEB KARLSSON and FRANS EMANUEL JOHANSON, subjects of the King of Sweden, and both residents of Gottenborg, Sweden, have invented new and useful Improvements in Ball-Cages for Ball-Bearings, of which the following is a specification.

This invention relates to ball cages for ball bearings of the type composed of two rings, one or both provided with projections whereby it is secured to and spaced axially from the other ring, said projections further constituting separators whereby the balls are kept apart.

The object of the invention is to provide a ball cage of this type which is strong, simple and reliable in construction, by obviating the use of separate members for securing together the various parts of which the ball cage is composed and in which the separators may yield to some extent to the pressure of the balls.

The invention consists, chiefly, in the combination with a ball cage of the type above referred to, of projections which extend inwardly from either ring or both, each projection consisting of a spacing part or bracket turned up from the edge of the ring and a wing turned up from said bracket and forming a separator for two consecutive balls.

In a ball cage comprising two rings and wings between them which separate the balls there may be employed, according to another feature of the invention, channel pieces formed by ears on the rings to receive the marginal portions of the wings and retain them in position.

Other details of the invention and various modifications thereof are hereinafter described in detail, and the novel features are set forth in the claims.

In the accompanying drawings—

Figures 1ª, 1ᵇ, 1ᶜ, 1ᵈ, and 1ᵉ, show segments of a cage ring of sheet-metal in different progressive stages of manufacture; and Figs. 2 and 3 show different sectional views of the ball cage in its finished state.

The ball cage shown in the illustration consists of two corresponding rings 12 of sheet-metal. Each ring is shown provided at its outer edge with projections to form brackets 13 and wings 14, 15, and with tongues 16 serving to hold the rings together. In the form shown the wings 14, 15 are of different size, one of them 14 extending first obliquely and then radially across the ring 12 to the inner edge thereof, while the other wing 15 acts as a strut and bears against the base of the longer wing 14. The latter is kept in position at its free end by means of two lugs 17 projecting one from each cage ring. The brackets are shown bent at substantially right angles to the edges of the cage rings.

In assembling the ball cage, the two cage rings 12 are placed on each side of the row of balls in such manner that the tongues 16 of the one ring are opposite the brackets 13 of the other ring. The tongues 16 are bent in such manner that they are situated somewhat nearer to the axis of the rings than the brackets 13, so that they can enter the triangular spaces 18 formed by the brackets 13 and the corresponding wings 14, 15 closely inside the brackets, until the ends of the tongues strike the opposite ring. By further pressure on the two rings the ends 16' of the tongues 16 will be bent so that they will lie closely against the opposite ring passing through the opening between the latter and the pair of wings belonging to said ring, whereby the two rings will be rigidly secured to each other, as shown in Fig. 3.

In order to provide for a suitable space between the inner edges of the wings and the inner surface of the ring and, at the same time, strengthen the ring, the outer edge of the latter may be bent laterally. In the form of ball cage shown, the inner edge of the ring is also bent similarly.

The rings 12 may, if desired, be provided with suitable ball-seats 19, such as those described with reference to the construction illustrated in Fig. 1.

A modified form of the ball cage last described is obtained by forming the one ring 12 with brackets 13 and wings 14, 15 and the other ring 12 with tongues 16 only. This modified form has the advantage that it may be used for an odd number of balls, while, on the other hand, it has the drawback that, on account of the rings being of different shape, they must be manufactured in different machines.

The form shown in the illustration may be used for an odd number of balls, by providing on the one ring two tongues 16 and on the other ring two brackets 13 adjacent to each other, dispensing with the intermediate bracket and tongue, respectively.

If desired, the wings 14, 15 may be of one and the same size so that both of them end at the inner edges of the rings, though the construction shown is preferred.

It should be noted that the ball cages above described may be modified in different ways without departing from the principle of the invention.

For instance, the brackets 2 or 13 with their wings may in certain cases be placed at the inner edges of the rings and the lugs 7 or 17 at the outer edges thereof, instead of vice versa. The brackets and lugs may also be placed at different edges alternately.

Having now described our invention, what we claim as new and desire to secure by Letters Patent is:—

1. A ball cage for ball bearings, comprising two rings of sheet-metal, having wings adapted to separate the balls, and brackets carrying said wings.

2. A ball cage for ball bearings, comprising two rings of sheet-metal, having wings adapted to separate the balls, and brackets carrying said wings, said brackets being bent at substantially right angles from the edges of the cage rings.

3. A ball cage for ball bearings, comprising two rings of sheet metal, having wings adapted to separate the balls, brackets carrying said wings, and projections engaging the free ends of the wings.

4. In a ball cage, comprising two rings and wings between them adapted to separate the balls, the combination of channel-pieces formed by ears of the rings to receive marginal portions of the wings.

5. A ball cage for ball bearings, comprising two rings of sheet metal, projections so folded as to provide recesses, and tongues engaging said recesses for assembling the cage rings.

6. A ball cage for ball bearings, comprising two rings of sheet metal, wings adapted to separate the balls, brackets carrying said wings, said wings and brackets being so folded as to form recesses, and tongues engaging said recesses for assembling the cage rings.

7. A ball cage for ball bearings, comprising two rings of sheet metal, each of said rings carrying projections consisting of brackets bent substantially at right angles from the edge of the ring, wings bent substantially at right angles from said brackets and forming together with said brackets recesses, and tongues bent from the edges of each ring and engaging said recesses for assembling the cage rings.

8. A ball cage for ball bearings, comprising two rings of sheet metal, each of said rings carrying alternately projections folded so as to provide recesses, and tongues engaging the recesses formed by the projections of the opposite cage ring.

9. A ball cage for ball bearings, comprising two rings of sheet metal, wings adapted to separate the balls, brackets carrying said wings, said wings and brackets being folded so as to form recesses, tongues engaging said recesses, and channel-pieces engaging the ends of the wings.

10. A ball cage for ball bearings, comprising rings of sheet-metal having projections so folded as to provide recesses and tongues engaging said recesses for assembling the cage rings.

11. A ball cage for ball bearings, comprising rings of sheet-metal, having projections so folded as to provide recesses and wings separating the balls, and tongues engaging said recesses for assembling the cage rings.

12. A ball cage for ball bearings, comprising rings of sheet-metal, having projections consisting of brackets and wings, bent so as to form recesses, and tongues engaging said recesses for assembling the cage rings.

13. A ball cage for ball bearings, comprising two rings of sheet metal, each of said rings carrying projections consisting of brackets bent substantially at right angles from the edge of the ring and wings bent substantially at right angles from said brackets and forming together with said brackets recesses, and tongues bent from the edges of each ring and engaging said recesses for assembling the cage rings.

14. A ball cage for ball bearings, comprising two rings of sheet metal, each of said rings carrying alternately projections folded so as to provide recesses, and tongues engaging the recesses formed by the folded projections of the opposite cage ring.

15. A ball cage for ball bearings, comprising rings of sheet metal, having at one edge projections consisting of brackets and wings bent so as to provide recesses, channel pieces bent from the other edge of the rings and engaging the ends of the wings and tongues engaging said recesses.

16. A ball cage for ball bearings comprising rings of sheet-metal having seats for the balls and projections so folded as to provide recesses and wings, and other projections forming tongues engaging the recesses formed by the folded projections on the opposite ring.

17. In a ball cage comprising rings having projections bent so as to form wings separating the balls, the combination of channel-pieces formed by ears of the rings to receive and clamp marginal portions of said wings.

18. A ball cage for ball bearings, comprising two rings of sheet-metal, each of said rings carrying projections consisting of brackets bent substantially at right angles from the edge of the ring and wings bent substantially at right angles from said brackets and forming together with said brackets recesses, tongues bent from the edges of each ring, and channel-pieces formed by ears of the rings to receive and clamp the ends of the said wings.

In testimony whereof we the said KALEB KARLSSON and FRANS EMANUEL JOHANSON have hereunto set our hands.

KALEB KARLSSON.
FRANS EMANUEL JOHANSON.